US010252376B2

(12) United States Patent
Simpson

(10) Patent No.: US 10,252,376 B2
(45) Date of Patent: Apr. 9, 2019

(54) WELDED LAP JOINT WITH CORROSIVE-PROTECTIVE STRUCTURE

(75) Inventor: David L. Simpson, Higley, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 972 days.

(21) Appl. No.: 12/396,615

(22) Filed: Mar. 3, 2009

(65) Prior Publication Data

US 2010/0224599 A1 Sep. 9, 2010

(51) Int. Cl.
*B23K 26/244* (2014.01)
*B23K 33/00* (2006.01)
*B23K 26/26* (2014.01)
*B23K 26/28* (2014.01)

(52) U.S. Cl.
CPC ....... *B23K 33/00* (2013.01); *Y10T 428/24198* (2015.01)

(58) Field of Classification Search
CPC ...... B23K 11/10; B23K 26/246; B23K 26/26; B23K 26/244; B23K 33/00; B23K 26/262; B23K 26/28; B23K 26/282; B23K 26/30; B23K 26/302; B32B 3/04; F28F 9/18; Y10T 428/24198
USPC ... 219/91.23, 121.62–121.63, 78.16, 121.64, 219/121.85, 612, 62, 102, 126; 429/454; 428/122
See application file for complete search history.

(56) References Cited

U.S. PATENT DOCUMENTS

| | | | | |
|---|---|---|---|---|
| 2,305,843 A | * | 12/1942 | Chagnon | 238/230 |
| 2,319,455 A | * | 5/1943 | Hardman et al. | 52/801.11 |
| 2,965,034 A | * | 12/1960 | Heidmann | 102/465 |
| 3,119,514 A | * | 1/1964 | Kaiser et al. | 220/274 |
| 3,149,856 A | * | 9/1964 | Schilberg | 180/89.2 |
| 3,165,815 A | * | 1/1965 | Wogerbauer | 29/897 |
| 3,581,047 A | * | 5/1971 | Mitchell, Jr. | 219/91.23 |
| 3,640,556 A | * | 2/1972 | Bennett | 403/410 |
| 3,650,005 A | * | 3/1972 | Kamiya et al. | 228/118 |
| 3,826,705 A | * | 7/1974 | Funk | 156/505 |
| 3,881,084 A | * | 4/1975 | Baardsen | 219/121.64 |
| 4,157,676 A | | 6/1979 | Jureit | |

(Continued)

FOREIGN PATENT DOCUMENTS

| | | | |
|---|---|---|---|
| CA | 2602622 A1 | * | 3/2008 |
| CN | 2603372 Y | * | 2/2011 |
| CN | 102059460 A | * | 5/2011 |
| DE | 102006051403 B3 | * | 2/2008 |

OTHER PUBLICATIONS

American Standard Channels, steel-sections-st, http://www.structural-drafting-net-expert.com/steel-sections-standard-channels.html.*

*Primary Examiner* — Michael G Hoang

(74) *Attorney, Agent, or Firm* — Richard E. Oney; Venjuris, P.C.

(57) ABSTRACT

The present invention includes a system, method, and apparatus for preventing corrosion in a lap joint. The lap joint includes a first member and a second member. The first member is adjacent to the second member to form a lap seam of the lap joint. The first member forms a channel at the lap seam relative to the second member. The channel forms a "V" shape, a "U" shape, or a semicircle shape relative to a horizontal plane of the lap joint. One or more openings are formed on the first member and/or the second member. The openings and channel of the present invention allows anti-corrosion material to coat the lap seam of the lap joint.

14 Claims, 9 Drawing Sheets

(56) References Cited

U.S. PATENT DOCUMENTS

| | | | |
|---|---|---|---|
| 4,187,407 A | 2/1980 | Marko, Jr. | |
| 4,407,611 A * | 10/1983 | Murray et al. | 405/284 |
| 4,583,675 A * | 4/1986 | Ochiai et al. | 228/155 |
| 4,602,468 A * | 7/1986 | Simpson | 52/410 |
| 4,642,446 A | 2/1987 | Pennington | |
| 4,677,271 A * | 6/1987 | Opprecht | 219/93 |
| 4,682,002 A * | 7/1987 | Piane et al. | 219/121.64 |
| 4,694,628 A * | 9/1987 | Vondergoltz et al. | 52/528 |
| 4,732,026 A * | 3/1988 | Ban | 72/52 |
| 4,763,807 A * | 8/1988 | Schreiber et al. | 220/274 |
| 4,788,411 A * | 11/1988 | Skinner | 219/127 |
| 4,807,414 A * | 2/1989 | Krause | 52/478 |
| 4,871,412 A * | 10/1989 | Felix et al. | 156/273.9 |
| 4,916,284 A * | 4/1990 | Petrick | 219/121.64 |
| 5,007,225 A * | 4/1991 | Teasdale | 52/783.17 |
| 5,241,785 A * | 9/1993 | Meyer | 52/520 |
| 5,348,575 A * | 9/1994 | Muller | C09D 5/008 106/14.34 |
| 5,449,081 A * | 9/1995 | Sjostedt et al. | 220/1.5 |
| 5,603,853 A * | 2/1997 | Mombo-Caristan | 219/121.64 |
| 5,685,118 A * | 11/1997 | Simpson | 52/520 |
| 5,737,894 A * | 4/1998 | Simpson et al. | 52/520 |
| 5,826,431 A * | 10/1998 | Makino et al. | 60/757 |
| 5,857,141 A * | 1/1999 | Keegan et al. | 428/560 |
| 6,042,659 A * | 3/2000 | Brown et al. | 148/519 |
| 6,045,028 A | 4/2000 | Martin et al. | |
| 6,123,369 A | 9/2000 | Wagner et al. | |
| 6,874,676 B1 * | 4/2005 | Elkouh et al. | 228/208 |
| 7,249,562 B2 * | 7/2007 | Forbes et al. | 105/355 |
| 7,328,771 B2 * | 2/2008 | Costa et al. | 181/214 |
| 7,337,727 B2 * | 3/2008 | Forbes | 105/404 |
| 7,416,769 B2 * | 8/2008 | Aota et al. | 428/58 |
| RE41,261 E * | 4/2010 | Forbes et al. | 105/355 |
| 7,984,596 B1 * | 7/2011 | Simpson et al. | 52/520 |
| 2002/0038954 A1 * | 4/2002 | Andreoli | 285/288.1 |
| 2002/0050487 A1 * | 5/2002 | Schwankhart | 219/121.59 |
| 2002/0127166 A1 * | 9/2002 | Bergeron et al. | 423/372 |
| 2002/0180196 A1 * | 12/2002 | Rychter et al. | 280/743.1 |
| 2003/0015872 A1 * | 1/2003 | Potts et al. | 285/420 |
| 2003/0184075 A1 * | 10/2003 | Freeman et al. | 280/797 |
| 2003/0219542 A1 * | 11/2003 | Ewasyshyn et al. | 427/421 |
| 2004/0042952 A1 * | 3/2004 | Bergeron et al. | 423/372 |
| 2005/0055903 A1 * | 3/2005 | Greenberg | 52/198 |
| 2005/0193644 A1 * | 9/2005 | Simpson et al. | 52/91.3 |
| 2005/0204674 A1 * | 9/2005 | Marshall | 52/544 |
| 2005/0246992 A1 * | 11/2005 | Rood, Jr. | 52/450 |
| 2006/0053732 A1 * | 3/2006 | Watson et al. | 52/693 |
| 2007/0038013 A1 * | 2/2007 | Wilson et al. | 588/318 |
| 2007/0068605 A1 * | 3/2007 | Statnikov | 148/558 |
| 2007/0110944 A1 * | 5/2007 | Grandominico et al. | 428/57 |
| 2007/0234928 A1 * | 10/2007 | Al-Kaabi et al. | 105/411 |
| 2008/0035615 A1 * | 2/2008 | Li et al. | 219/121.63 |
| 2008/0193824 A1 * | 8/2008 | Fasce et al. | 429/34 |
| 2009/0044477 A1 * | 2/2009 | Simpson et al. | 52/520 |

* cited by examiner

SAMPLE BEAM WITH A 1.62" FLANGE
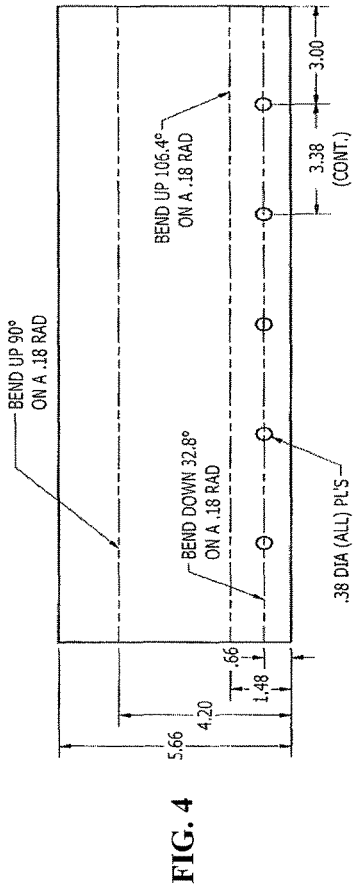
FIG. 4
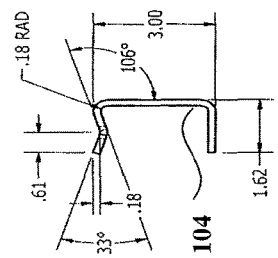
FLAT PATTERN
OF FLANGE 104
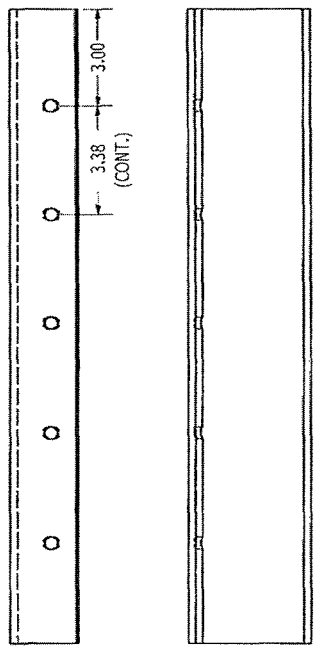
FIG. 5
FIG. 6
FORMED VIEWS
OF FLANGE 104

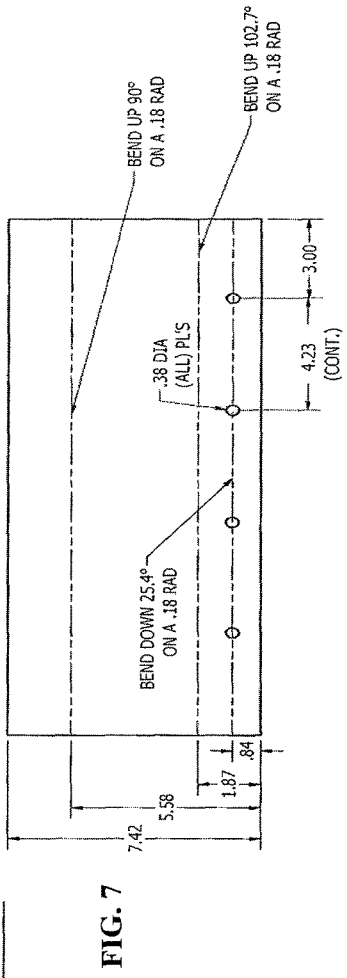
FIG. 7
SAMPLE BEAM WITH A 2.00" FLANGE
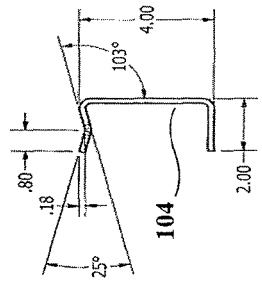
FLAT PATTERN OF FLANGE 104
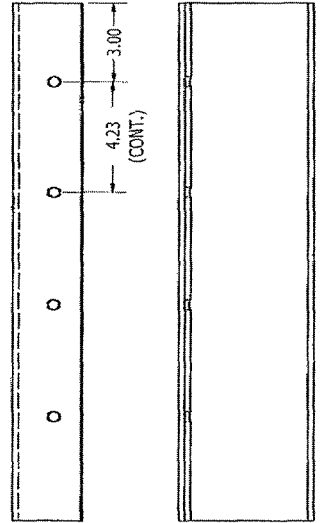
FIG. 9
FIG. 8
FORMED VIEWS OF FLANGE 104

SAMPLE BEAM WITH A 2.25" FLANGE

FORMED VIEWS OF FLANGE 104

SAMPLE BEAM WITH A 3.00" FLANGE

FLAT PATTERN OF FLANGE 104

FORMED VIEWS OF FLANGE 104

WELDED LAP JOINT WITH CORROSIVE-PROTECTIVE STRUCTURE

FIELD OF INVENTION

The present invention generally relates to a lap joint, and more particularly, to a system, method, and apparatus for configuring a channel of a lap joint at an angle and with one or more openings at or near the lap seam to allow anticorrosion material to reach the lap joint particularly at the lap seam.

BACKGROUND

A lap joint is typically configured by joining or overlapping two sections of one or more materials to form a structure. Lap joints are often used in building construction, vehicles, equipment, and many other applications. One problem with joining or overlapping sections includes formation of rust or other corrosion on the surfaces that are joined or overlapped (e.g., at the lap seam of the lap joint). Structures are typically coated with anticorrosion material in all areas except the lap joint. This eventually leads to rust and other corrosion at the lap seam of the lap joint, because it is too difficult or impossible to put the anticorrosion material into the lap seam.

It is desirable to form a lap joint that allows plating material to reach the lap seam, which extends the life of the product. Forming a lap joint that allows anticorrosion material (e.g., plating) to reach the lap seam substantially prevents rust or other corrosion at the lap seam. Preventing rust or other corrosion at the lap seam or lap joint adds longevity or extends the life of the product, structure, or building in which the improved lap joint is used.

SUMMARY

Exemplary embodiments of the present invention include a system, method, and apparatus for configuring a lap joint with an angle and one or more openings at the lap seam to allow anticorrosion material to reach the lap joint particularly at the lap seam such as:

An apparatus including: a channel formed on a first member of a lap joint, where the channel forms one or more angles relative to a horizontal plane of the lap joint and the one or more angles is greater than zero; and the first member includes one or more openings at the channel.

The apparatus further including at least one of the channel, the first member, a second member of the lap joint adjacent to the first member, and a lap seam of the lap joint formed between the first member and the second member are configured to receive anticorrosion material.

The apparatus where the lap seam is a hem seam.

The apparatus of claim 1 where at least one of:

a bend allowance (Bend A) for a 90 degree bend for the one or more angles is calculated using the bend radius (BR) and sheet metal thickness (THICK) as the Bend A=(0.64*THICK)+(1.57*BR);

a dimension B=(A−(Bend A))/2;

an Area Necessary To Vent Properly=((0.5 square inches)*pi)/4=0.1964 square inches;

a Minimum D (Min_D)=(0.1964 square inches)/(2*B) and if Min_D<BR, then D=BR, otherwise, D=Min_D;

an angle ANG1=2*arcTan(D/B);

an angle ANG2=90+(0.5*ANG1); and a hole spacing H=(4.8*B)+Diameter of opening 111 (or opening 113).

The apparatus where the channel formed on the first member is a "V" shape, a "U" shape, or a semicircle shape relative to the horizontal plane of the lap joint.

An apparatus including: a channel formed on a first member of a lap joint, where the channel forms a "V" shape, a "U" shape, or a semicircle shape relative to the horizontal plane of the lap joint; and the first member includes one or more openings at the channel.

An apparatus including: a lap joint including a first member and a second member; the first member is adjacent to the second member to form a channel at a lap seam of the lap joint; the first member forming one or more angles relative to the second member, where the one or more angles is greater than zero; and at least one of the first member and the second member includes one or more openings at or near the channel.

A method including the step(s) of: configuring a channel formed on a first member of a lap joint to form at least one of a "V" shape, a "U" shape, and a semicircle shape relative to a horizontal plane of the lap joint.

The method further including forming one or more openings on at least one of the channel, the first member, a second member of the lap joint adjacent to the first member, and a lap seam of the lap joint formed between the first member and the second member.

The method further including coating at least one of the channel, the first member, the second member, and the lap seam with anticorrosion material.

The method further including at least one of:

configuring the lap joint to have the first member and a second member;

configuring the first member to be adjacent to the second member to form the channel at the lap seam of the lap joint; and configuring the first member to form an angle relative to the second member, where the angle is greater than zero.

A method including the steps of: configuring a lap joint to have a first member and a second member; configuring the first member to be adjacent to the second member to form a lap seam of the lap joint; configuring the first member to form a channel at the lap seam relative to the second member, where the channel forms at least one of a "V" shape, a "U" shape, and a semicircle shape relative to a horizontal plane of the lap joint; and forming one or more openings on at least one of the first member and the second member at or near the channel.

The method further including at least one of:

a bend allowance (Bend A) for a 90 degree bend for the one or more angles is calculated using the bend radius (BR) and sheet metal thickness (THICK) as the Bend A=(0.64*THICK)+(1.57*BR);

a dimension B=(A−(Bend A))/2;

an Area Necessary To Vent Properly=((0.5 square inches)*pi)/4=0.1964 square inches;

a Minimum D (Min_D)=(0.1964 square inches)/(2*B) and if Min_D<BR, then D=BR, otherwise, D=Min_D;

an angle ANG1=2*arcTan(D/B);

an angle ANG2=90+(0.5*ANG1);

a hole spacing H=(4.8*B)+Diameter of opening 111 (or opening 113).

BRIEF DESCRIPTION OF THE DRAWINGS

Exemplary embodiments of the present invention are described in the context of the appended drawing figures, where like numerals designate like elements:

FIGS. 4-15 illustrate apparatuses in accordance with exemplary embodiments of the present invention including various beams with flanges;

DETAILED DESCRIPTION

Figure 1:
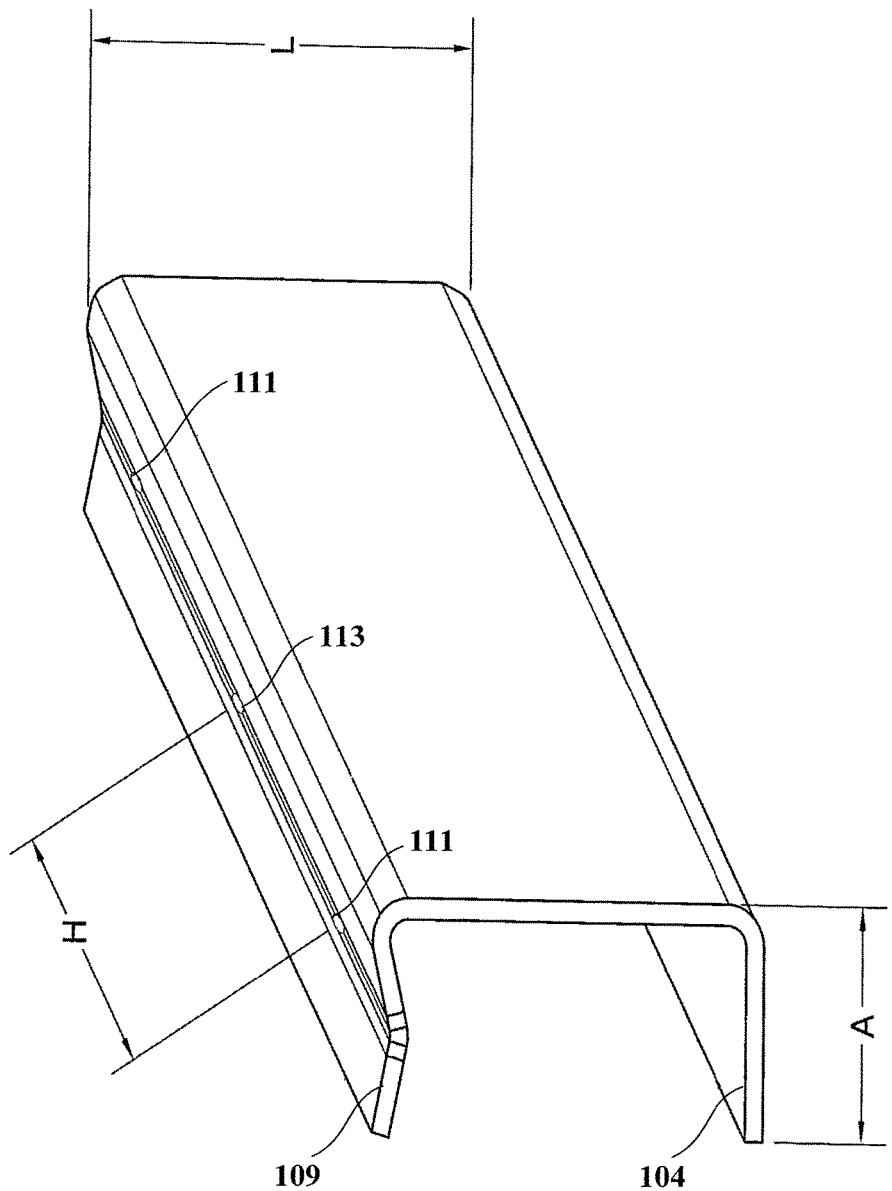
FIG. 1 illustrates an apparatus in accordance with an exemplary embodiment of the present invention including the placement of openings 111 and 113, flange length "A", and hole spacing "H"
Figure 2:
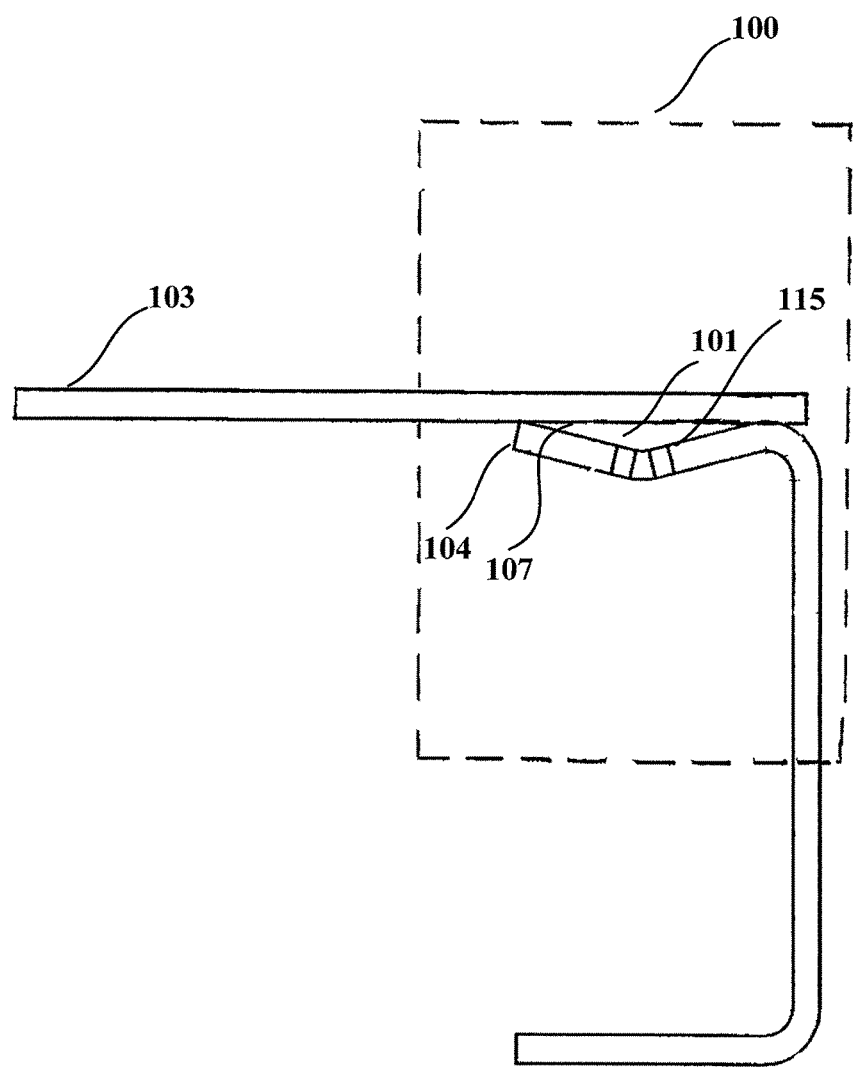
FIG. 2 illustrates an apparatus in accordance with an exemplary embodiment of the present invention including second member 103 configured with first member 104 of lap joint 100 to create lap seam 101.

The present invention of a lap joint with a corrosive-protective structure substantially or completely prevents rust and other corrosion typically developed at a lap seam 101 or other parts of a lap joint 100. In FIGS. 1 and 2, a second member 103 (e.g., a beam) is configured with a first member 104 (e.g., a flange) of lap joint 100 to create lap seam 101. For example, second member 103 can be placed in contact with first member 104 as illustrated in FIG. 2 to form lap seam 101. First member 104 includes a channel 115 relative to a horizontal plane (e.g., the x plane) of lap joint 100 in FIG. 2. Lap seam 101 with channel 115 allows lap joint 100 to receive anticorrosion material on first and second surfaces 107 and 109 of second member 103 and first member 104 respectively (e.g., when lap joint 100 is dipped in anticorrosion material). One or more openings 111 and 113 (e.g., holes) placed strategically along first and/or second members 104 and 103 allow the anticorrosion material (e.g., plating, galvanization, powder coat, or other) to seep through into difficult to reach areas of lap joint 100 (e.g., lap seam 101). For example, if the anticorrosion material is through a powder coat process, then typically openings 111 and 113 will be more in number to accommodate the powder coat process.

Figure 16:
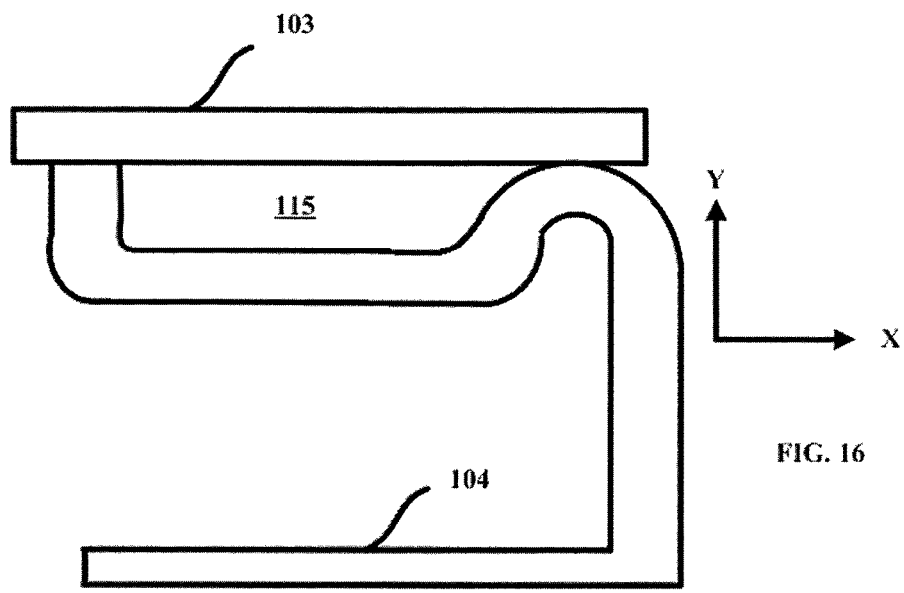
FIGS. 16 and 17 illustrate various shapes of channel 115 in accordance with exemplary embodiments of the present invention.
Figure 17:
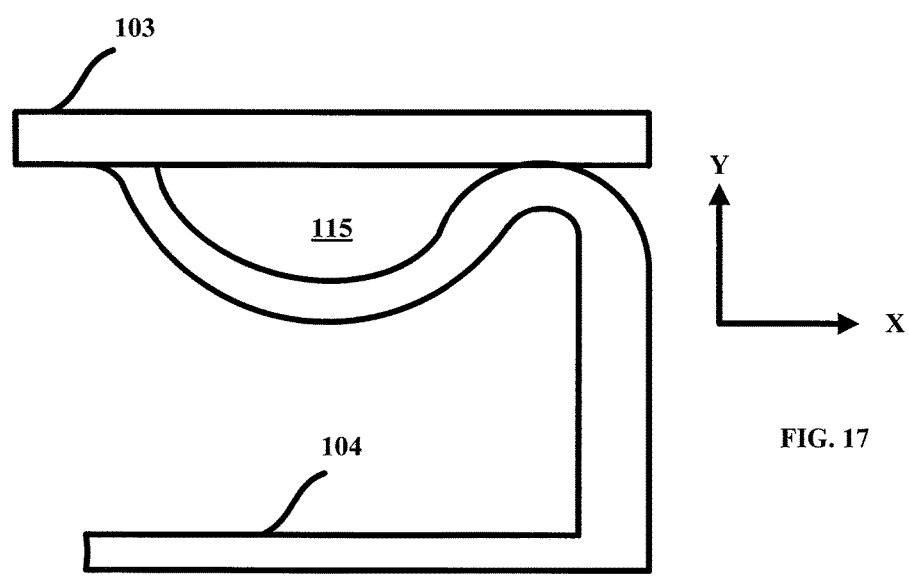

In the exemplary embodiments of FIGS. 1 and 2, channel 115 of first member 104 (e.g., at lap seam 101 on first member 104) forms an angle 105 (e.g., two times 90 degrees minus one-half of angle ANG1 (or 2*(90 degrees−(0.5*ANG1))) relative to the x plane at lap seam 101 of lap joint 100. The degree of angle 105 of channel 115 is calculated by a formula derived in relation to the type and size of lap joint 100. In the exemplary embodiments of FIGS. 1 and 2, channel 115 is illustrated as a "V" shape forming angle 105; however, in FIGS. 16 and 17, channel 115 may be configured as a "U" shape, semicircle shape, or any other configuration.

The placement of openings 111 and 113 is calculated by a formula derived in relation to the type and size of lap joint 100. Even though openings 111 and 113 are illustrated as circular openings, openings 111 and 113 can be virtually any shape and there can be any number of openings 111 and 113. First and second members 104 and 103 can be any metal, sheet metal, plate metal, wood, plastic, acrylic, or other material of virtually any shape that can be formed, bent, positioned, or welded into any desired configuration.

In the past, when first and/or second members (e.g., a piece of sheet metal) was dipped into an anticorrosion material (e.g., plating substance, galvanization, powder coat, or other), the anticorrosion material would not reach lap seam 101 (e.g., where the two metal pieces were welded, positioned, or formed together). Using first and/or second members 104 and 103 when welding lap joint 100 together, channel 115, angle 105, and openings 111 and 113 of lap joint 100 will allow the anticorrosion material to coat substantially all or all areas of first and/or second members 104 and 103 to substantially prevent corrosion within lap seam 101.

Figure 18:
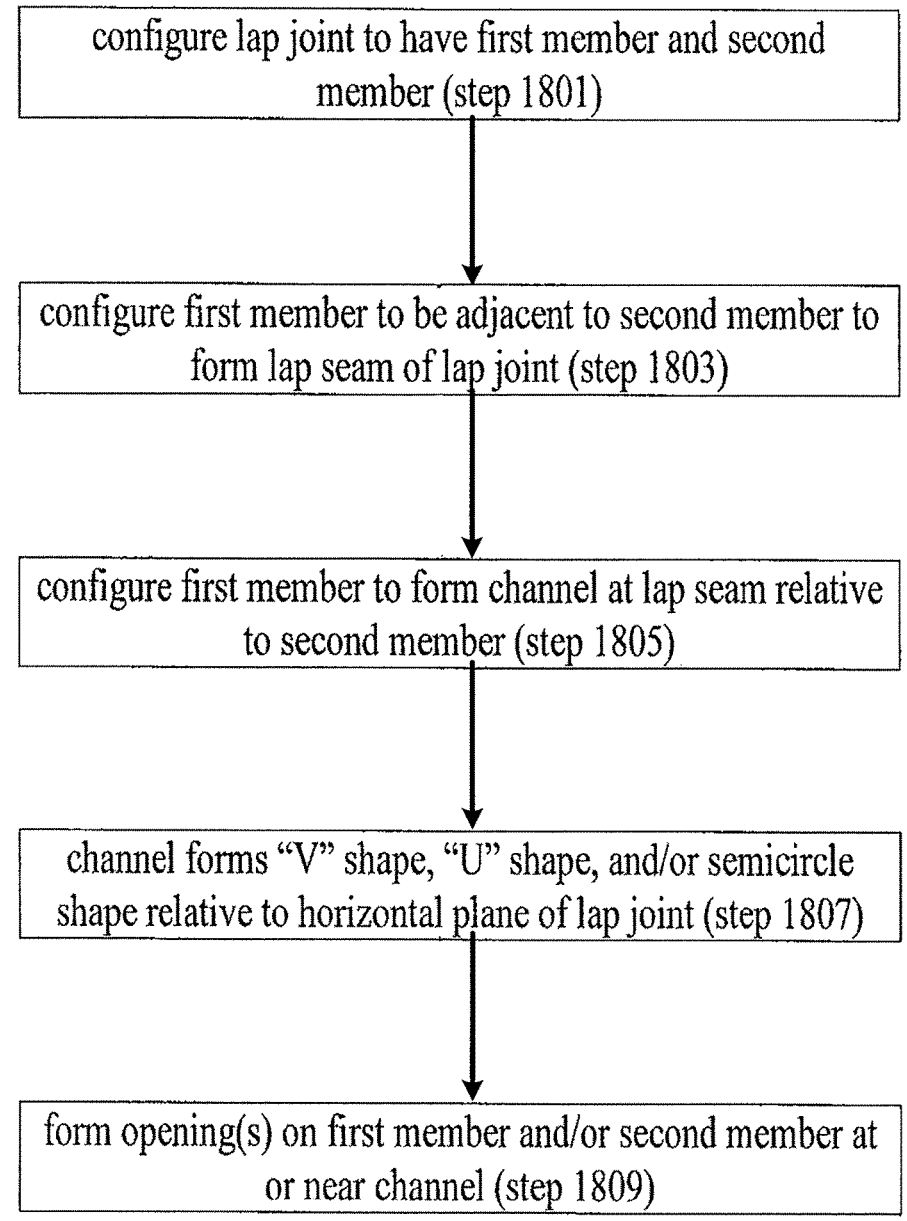
FIG. 18 is a flowchart illustrating a method for configuring at least one member of a lap joint in accordance with an exemplary embodiment of the present invention.

FIG. 18 is a flowchart illustrating a method for configuring at least one member of lap joint 100 in accordance with an exemplary embodiment of the present invention. The method includes configuring lap joint 100 to have first member 104 and second member 103 (step 1801) and configuring first member 104 to be adjacent to second member 103 to form lap seam 101 of lap joint 100 (step 1803). The method also includes configuring first member 104 to form channel 115 at lap seam 101 relative to second member 103 (step 1805), where channel 115 forms at least one of a "V" shape, a "U" shape, and a semicircle shape relative to a horizontal plane of lap joint 100 (step 1807). The method further includes forming one or more openings on at least one of first member 104 and second member 103 at or near channel 115 (step 1809).

An exemplary embodiment for calculating angle 105 and the placement of openings 111 and 113 is illustrated. These calculations include determining a flange length (labeled as "A" on FIGS. 1 and 3). Flange length A can vary depending on the application or desired use of lap joint 100 (e.g., where the flange can be first member 104). The gauge of sheet metal (e.g., the thickness, labeled "THICK") and the bend radius (labeled "BR") desired to create a part (e.g., a flange) are determined. For example, to calculate the bend allowance (Bend A) for a 90 degree bend, the bend radius and sheet metal thickness are used to calculate Bend A as follows:

$$\text{Bend } A = (0.64 * \text{THICK}) + (1.57 * BR)$$

The bend allowance (Bend A) is used to determine the dimension "B" (e.g., the length of the center of hole spacing H below to the end of a flange (e.g., first member 104) and a distance "D" in FIG. 3). The distance D is based on the minimum area necessary to properly vent galvanized flow in lap seam 101. For example, the area for proper venting of zinc coatings is specified in ASTM A385 10.3 as a 0.110 in^2 opening (0.375 inch diameter circular opening). ASTM is the American Society for Testing and Materials. To maintain this area, a baseline can be established using a calculation for a 0.50 inch diameter opening to establish a venting area that could then be used in the Minimum_D calculation (herein) in order to obtain the Minimum_D and to maintain the 0.110 in^2 minimum area. The distance D and various other calculations will vary if the process is powder coat instead of the illustrated hot dip galvanize process. The greater the distance D, then the better the material can flow in lap seam 101. If the bend radius is larger than the minimum area necessary to properly vent galvanized flow in lap seam 101, then the distance D is equal to the bend radius. For example, the following calculations are made:

$$B = (A - (\text{Bend } A))/2$$

Area Necessary To Vent Properly=((0.5 square inches)*pi)/4=0.1964 square inches, where pi=Π

Minimum $D$ (Min_$D$)=(0.1964 square inches)/(2*$B$)

If Min_D<BR, Then D=BR
Otherwise, D=Min_D

Figure 3:
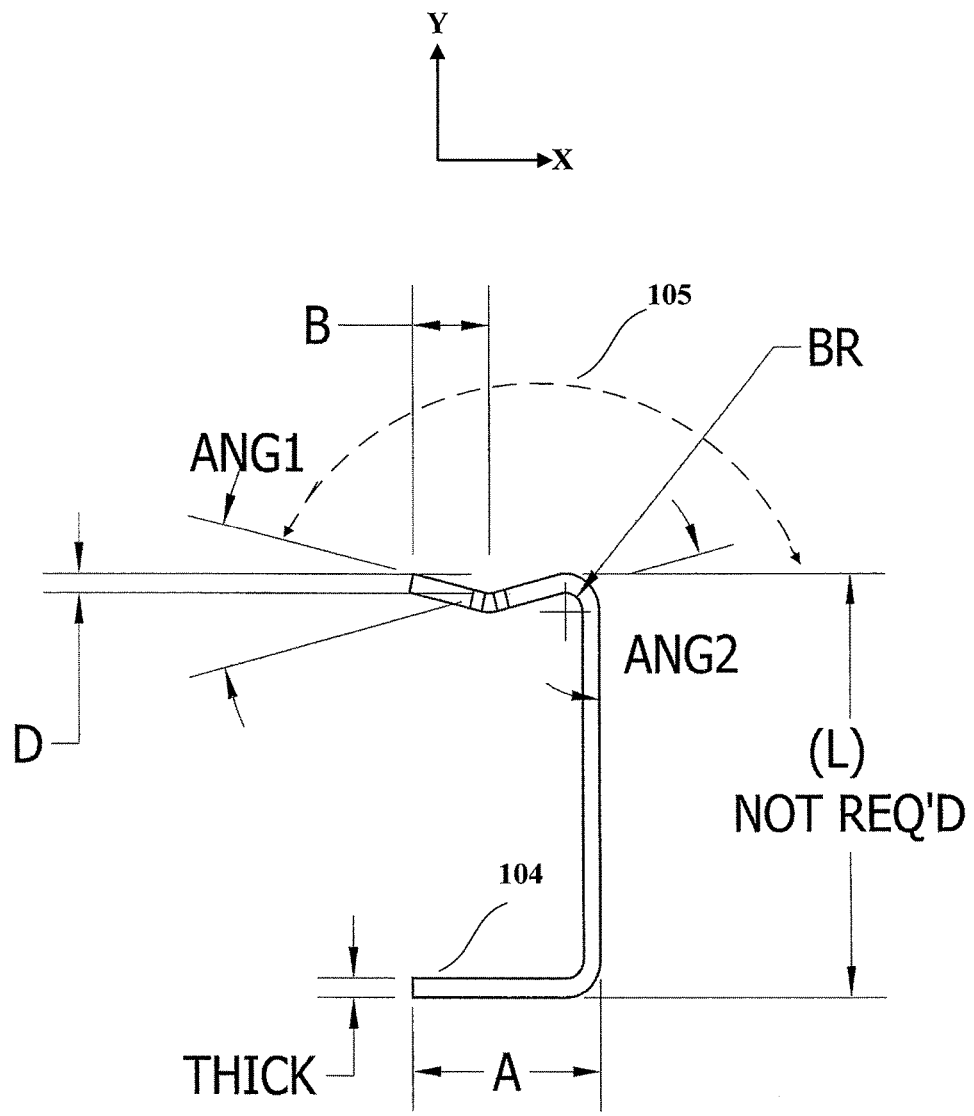
FIG. 3 illustrates an apparatus in accordance with an exemplary embodiment of the present invention including dimension "B" and distance "D"

Angles ANG1 and ANG2 in FIG. 3 are calculated as follows:

$$\text{ANG1} = 2 \cdot \arctan(D/B)$$

$$\text{ANG2} = 90 + (0.5 \cdot \text{ANG1})$$

The hole spacing (labeled "H" in FIG. 1) of openings 111 and 113 is calculated as follows:

$$H = (4.8 \cdot B) + \text{Diameter of opening 111 (or opening 113)}$$

The diameter of each of openings 111 and 113 can be calculated based on flange length A. For example, if flange length A is less than or equal to 2 inches, then the diameter of opening 111 can be ⅜ inch and the diameter of opening 113 can be ⅜ inch. In another example, if flange length A is greater than 2 inches, then the diameter of opening 111 can be ½ inch and the diameter of opening 113 can be ½ inch.

Various exemplary embodiments of calculating angles ANG1 and ANG2 and the hole spacings of openings 111 and 113 are below. These exemplary embodiments illustrate a "V" shape channel 115; however, adjustments and/or other calculations can be made for a "U" shape, semicircle shape, or other configurations of channel 115.

Example 1 in FIGS. 4, 5, and 6

Select flange length A=1.62 inches, THICK=0.1793 inches, and BR=0.18 inches. Use the bend radius and sheet metal thickness (THICK) as follows to determine the bend allowance (Bend A) for a 90 degree bend:

Bend $A$=(0.64*0.1793 inches)+(1.57*0.18 inches)= 0.397 inches

Use the bend allowance (Bend A) to calculate the dimension B and distance D as follows:

$B$=(1.62 inches−0.397 inches)/2=0.612 inches

Minimum $D$ (Min_$D$)=(0.1964 square inches)/ (2*0.612 inches)=0.161 inches

Since the bend radius is larger than the minimum distance calculated then D=BR=0.18 inches. ANG1 and ANG2 are calculated as follows:

ANG1=2*arcTan(0.18 inches/0.612 inches)=32.8 degrees

ANG2=90 degrees+(0.5*32.8 degrees)=106.4 degrees

The hole spacing H is calculated as follows:

$H$=(4.8*0.612 inches)+0.38 inches=3.32 inches

Example 2 in FIGS. 7, 8, and 9

Select flange length A=2.00 inches, THICK=0.1793 inches, and BR=0.18 inches. Use the bend radius and sheet metal thickness (THICK) as follows to determine the bend allowance (Bend A) for a 90 degree bend:

Bend $A$=(0.64*0.1793 inches)+(1.57*0.18 inches)= 0.397 inches

Use the bend allowance (Bend A) to calculate the dimension B and distance D as follows:

$B$=(2.00 inches−0.397 inches)/2=0.802 inches

Minimum $D$ (Min_$D$)=(0.1964 square inches)/ (2*0.802 inches)=0.122 inches

Since the bend radius is larger than the minimum distance calculated then D=BR=0.18 inches. ANG1 and ANG2 are calculated as follows:

ANG1=2*arcTan(0.18 inches/0.802 inches)=25.4 degrees

ANG2=90 degrees+(0.5*25.4 degrees)=102.7 degrees

The hole spacing H is calculated as follows:

$H$=(4.8*0.802 inches)+0.38 inches=4.23 inches

Figure 10:
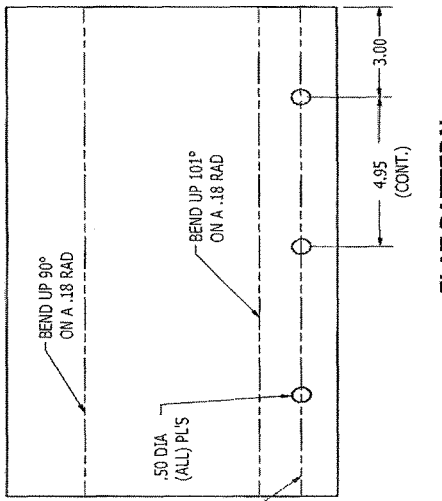
Figure 11:
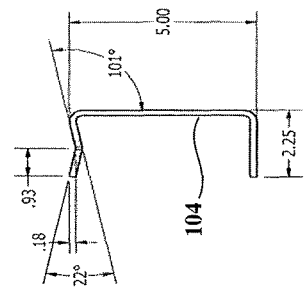
Figure 12:
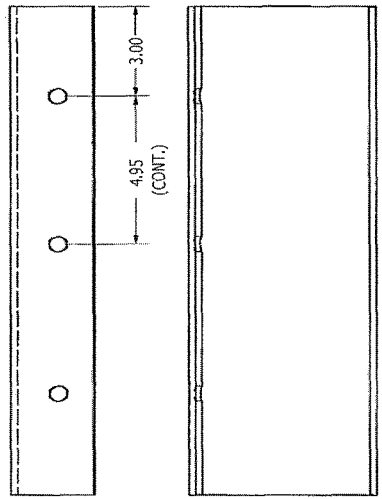

Example 3 in FIGS. 10, 11, and 12

Select flange length A=2.25 inches, THICK=0.1793 inches, and BR=0.18 inches. Use the bend radius and sheet metal thickness (THICK) as follows to determine the bend allowance (Bend A) for a 90 degree bend:

Bend $A$=(0.64*0.1793 inches)+(1.57*0.18 inches)= 0.397 inches

Use the bend allowance (Bend A) to calculate the dimension B and distance D as follows:

$B$=(2.25 inches−0.397 inches)/2=0.927 inches

Minimum $D$ (Min_$D$)=(0.1964 square inches)/ (2*0.927 inches)=0.106 inches

Since the bend radius is larger than the minimum distance calculated then D=BR=0.18 inches. ANG1 and ANG2 are calculated as follows:

ANG1=2*arcTan(0.18 inches/0.927 inches)=22.0 degrees

ANG2=90 degrees+(0.5*22.0 degrees)=101.0 degrees

The hole spacing H is calculated as follows:

$H$=(4.8*0.927 inches)+0.5 inches=4.95 inches

Figure 13:
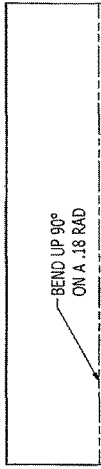
Figure 14:
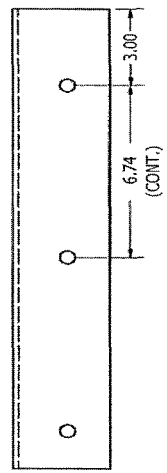
Figure 15:
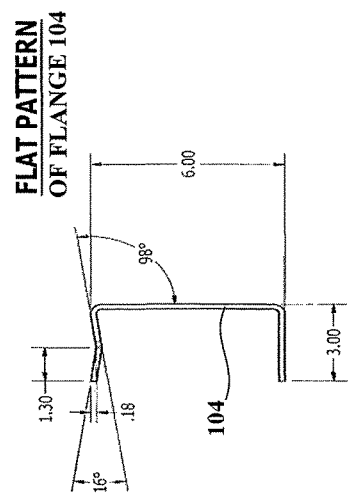

Example 4 in FIGS. 13, 14, and 15

Select flange length A=3.00 inches, THICK=0.1793 inches, and BR=0.18 inches. Use the bend radius and sheet metal thickness (THICK) as follows to determine the bend allowance (Bend A) for a 90 degree bend:

Bend $A$=(0.64*0.1793 inches)+(1.57*0.18 inches)= 0.397 inches

Use the bend allowance (Bend A) to calculate the dimension B and distance D as follows:

$B$=(3.00 inches−0.397 inches)/2=1.302 inches

Minimum $D$ (Min_$D$)=(0.1964 square inches)/ (2*1.302 inches)=0.0754 inches

Since the bend radius is larger than the minimum distance calculated then D=BR=0.18 inches. ANG1 and ANG2 are calculated as follows:

ANG1=2*arcTan(0.18 inches/1.302 inches)=15.8 degrees

ANG2=90 degrees+(0.5*15.8 degrees)=97.9 degrees

The hole spacing H is calculated as follows:

H=(4.8*1.302 inches)+0.5 inches=6.74 inches

In exemplary embodiments, corrosion differences occur between welded lap joints using lap joint 100 versus a standard prior art lap joint. For example, samples of lap joint 100 versus prior art lap joints were initially inserted into a salt spray chamber. At the end of each 500 hour interval, the samples were evaluated including visual methods and physical properties (e.g., welded lap joints being flexed to verify strength).

The exemplary test procedures used up to 2500 hours of salt spray that would be interrupted every 500 hours for visual inspection, weld strength evaluation, and the removal of one sample for destructive joint analysis (e.g., cutting welded lap joint apart). Samples were suspended in the salt spray chamber. At the end of the first 500 hours, all samples were removed from the salt spray chamber.

A bar can be used to apply sufficient leverage to the sample welded lap joints to test their strength. An alternating upward and downward flexing force applied to the far end of the bar stresses the welded lap joints. Once this procedure was performed on the samples, the samples returned to the salt spray chamber to accumulate another 500 hours. This method was repeated until 2500 hours was reached.

Each sample was kept in the salt spray chamber for testing at 500 hour increments. Various samples were removed from the chamber at the prescribed interval (1 sample at 500 hours, 1 sample at 1000 hours, 1 sample at 1500 hours, 1 sample at 2000 hours, and 1 sample at 2500 hours). Each welded lap joint sample was cut apart to reveal the surfaces inside the lap joint. The prior art lap joints had significantly more corrosion (e.g., rust) compared to lap joint 100.

Thus, lap joint 100 with a corrosive-protective structure substantially or completely prevents rust and other corrosion typically developed at a lap seam 101 or other parts of a lap joint 100.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any method or process may be executed in any order and are not limited to the order presented in the method or process.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. An apparatus for a structural frame, the apparatus comprising:
   a welded lap joint comprising a first metal member and a second metal member welded together;
   wherein an elongated channel formed on the first metal member has channel ends, the channel forms one or more angles relative to a horizontal plane of the lap joint, and each of the one or more angles is greater than zero;
   wherein the channel includes an interior surface configured to face the second metal member of the lap joint;
   wherein the first metal member includes one or more openings in the channel interior surface disposed between and distal to each of the channel ends, wherein the one or more openings are configured to receive a liquid anticorrosion material in the channel;
   wherein the lap joint is configured so that the channel and the second metal member define a passageway having a length extending (i) from one of the one or more openings to one of the channel ends, or (ii) if the one or more openings comprises a plurality of openings, from one of the plurality of openings to another of the plurality of openings; and
   wherein the lap joint is configured so that the liquid anticorrosion material received into the channel through the one or more openings forms a coating of the liquid anticorrosion material disposed within the passageway along its length.

2. The apparatus of claim 1 wherein the lap joint further comprises a lap seam formed between the first metal member and the second metal member, and wherein the coating of the anticorrosion material coats the lap seam.

3. The apparatus of claim 2 wherein the lap seam is a hem seam.

4. The apparatus of claim 1 further comprising at least one of:
   a bend allowance (Bend A) for a 90 degree bend for the one or more angles is calculated using a bend radius (BR) and sheet metal thickness (THICK) as the Bend A=(0.64*THICK)+(1.57*BR);
   a dimension B=(A−(Bend A))/2;
   a Minimum D (Min_D)=(0.1964 square inches)/(2*B) and if Min_D<BR, then D=BR, otherwise, D=Min_D;
   an angle ANG1=2*arcTan(D/B);
   an angle ANG2=90+(0.5*ANG1); and
   a hole spacing H=(4.8*B)+(a diameter of at least one of the one or more openings).

5. The apparatus of claim 1 wherein the channel formed on the first metal member is a "V" shape, a "U" shape, or a semicircle shape relative to the horizontal plane of the lap joint.

6. The apparatus of claim 1 wherein the one or more openings in the channel interior surface comprise a plurality of openings and wherein a spacing between two adjacent openings of the plurality of openings is a function of a depth of the channel.

7. The apparatus of claim 1 wherein the one or more openings in the channel interior surface comprise a plurality of openings and wherein a spacing between two adjacent openings of the plurality of openings is a function of a width of the channel.

8. An apparatus for a structural frame, the apparatus comprising:
   a welded lap joint comprising a first metal member and a second metal member welded together;

wherein an elongated channel on the first metal member forms a "V" shape, a "U" shape, or a semicircle shape relative to a horizontal plane of the lap joint;

wherein the channel has channel ends and includes an interior surface configured to face a second metal member of the lap joint;

wherein the first metal member includes one or more openings in the interior surface disposed between the channel ends and configured to receive a liquid anticorrosion material in the channel;

wherein the lap joint is configured so that the channel and the second metal member define a passageway having a length extending (i) from one of the one or more openings to one of the channel ends, or (ii) if the one or more openings comprises a plurality of openings, from one of the plurality of openings to another of the plurality of openings;

wherein the lap joint is configured so that the channel interior surface can be coated along the length of the passageway with the liquid anticorrosion material introduced into the channel through the one or more openings.

9. An apparatus for a structural frame comprising:
a welded lap joint including a first metal member and a second metal member;

wherein the first metal member is joined to the second metal member with a weld to form an elongated channel at a lap seam of the welded lap joint wherein the channel has a length with an interior surface;

wherein the first metal member forms one or more angles relative to the second metal member, wherein the one or more angles is greater than zero;

wherein the lap joint includes a plurality of openings positioned along the channel length based on dimensions of the channel;

wherein the plurality of openings are configured to receive a liquid anticorrosion material in the channel; and wherein the interior surface of the channel of the welded lap joint can be coated along the channel length with the liquid anticorrosion material introduced into the channel through the plurality of openings.

10. A method for forming a structural frame joint, the method comprising the step(s) of:
configuring a channel formed on a first metal member of a lap joint to form at least one of a "V" shape, a "U" shape, and a semicircle shape relative to a horizontal plane of the lap joint;

wherein the channel includes an interior surface configured to face a second metal member of the lap joint and the first metal member includes one or more openings in the interior surface, wherein each of the one or more openings is located distal to a channel end and is configured to receive a liquid anticorrosion material in the channel; and wherein the channel has a length extending from (i) one of the one or more openings to the channel end, or (ii) if the one or more openings comprises a plurality of openings, from one of the plurality of openings to another of the plurality of openings;

forming the lap joint with the first metal member and the second metal member, wherein forming the lap joint includes welding the first metal member to the second metal member; and after the channel is configured and the lap joint is formed, coating the channel interior surface with the liquid anticorrosion material along the channel length by dipping the lap joint into the liquid anticorrosion material to introduce the liquid anticorrosion material into the channel through the one or more openings.

11. The method of claim 10 further comprising forming one or more openings on the second metal member of the lap joint adjacent to the first metal member.

12. The method of claim 10 further comprising at least one of:
configuring the lap joint to have the first metal member and the second metal member;
configuring the first metal member to be adjacent to the second metal member to form the channel at a lap seam of the lap joint; and
configuring the first metal member to form an angle relative to the second metal member, wherein the angle is greater than zero.

13. A method for forming a structural frame joint, the method comprising the steps of:
welding a first metal member to a second metal member to form a lap seam of a lap joint, wherein the first metal member forms a channel at the lap seam relative to the second metal member and the channel has a length with an interior surface;

forming one or more openings on at least one of the first metal member and the second metal member, wherein each of the one or more openings is configured to receive a liquid anticorrosion material in the channel, and wherein the channel length extends (i) from one of the one or more openings to a channel end, or (ii) if the one or more openings comprises a plurality of openings, from one of the plurality of openings to another of the plurality of openings; and coating the channel length with the liquid anticorrosion material by dipping the lap joint into the liquid anticorrosion material to introduce the liquid anticorrosion material into the channel through each of the one or more openings.

14. The method of claim 13 wherein the lap joint comprises at least one of:
a bend allowance (Bend A) for a 90 degree bend for the one or more angles is calculated using a bend radius (BR) and sheet metal thickness (THICK) as the Bend A=(0.64*THICK)+(1.57*BR);
a dimension B=(A−(Bend A))/2;
a Minimum D (Min_D)=(0.1964 square inches)/(2*B) and if Min_D<BR, then D=BR, otherwise, D=Min_D;
an angle ANG1=2*arcTan(D/B);
an angle ANG2=90+(0.5*ANG1); and
a hole spacing H=(4.8*B)+(a diameter of at least one of the one or more openings).

* * * * *